United States Patent Office 3,476,735
Patented Nov. 4, 1969

---

3,476,735
PREPARATION OF POLYMERS OF CONJUGATED DIENES
Nikolaus Schon, Leverkusen, Josef Witte, Cologne-Stammheim, and Gottfried Pampus, Leverkusen, Germany, assignors to Farbenfabriken Bayer Aktiengesellschaft, Leverkusen, Germany, a corporation of Germany
No Drawing. Continuation of application Ser. No. 352,975, Mar. 18, 1964. This application May 15, 1968, Ser. No. 731,674
Int. Cl. C08d 1/00, 1/14
U.S. Cl. 260—94.7          9 Claims

---

ABSTRACT OF THE DISCLOSURE

Recovering polybutadiene polymer from a mixture prepared by polymerizing 1,3-butadiene in the presence of a titanium-containing catalyst in a hydrocarbon diluent containing a phenolic stabilizer for the polymer by steam distilling off hydrocarbon diluent-water vapor mixture and the improvement thereof by forming a water-in-oil emulsion in the presence of specified emulsifiers followed by steam distillation of the water-in-oil emulsion.

---

This application is a continuation of application Ser. No. 352,975 as filed Mar. 18, 1964, and now abandoned.

This invention relates to a process for the production of solid diene polymers. More particularly it relates to a process in which a conjugated diene is polymerized with specific catalysts in the presence of a hydrocarbon diluent, followed by precipitating the formed polymer in the hydrocarbon diluent and recovering a rubbery polymer, substantially free of diluent, by steam distillation.

Recently several processes that can be used on a technical scale have been known for working up polyolefine or diolefine polymers from solutions in aliphatic or aromatic solvents, containing stereospecific coordination catalysts. If the polymer is dissolved in an organic solvent that is immiscible with water, the solvent may advantageously be removed by steam distillation and the polymer obtained in a crumbly form. Thus, for example, the organic solvent can be distilled off as a mixture with water from a solution of chlorinated rubber in carbon tetrachloride by introducing hot water to obtain an easily filtered suspension of chlorinated rubber in water free from solvent. Similar processes of working up have also been described for isolating polyolefines which are prepared in organic solvents with the aid of organometallic mixed catalysts or chromium oxide catalysts, for example according to British patent specification No. 856,326. Finally, the isolation of elastomers from solutions in aliphatic or aromatic hydrocarbon diluents by steam distillation is also known and has been described for example in Belgian patent specification Nos. 602,010; and 602,119 and in U.S. patent specification No. 2,905,658.

In this method of working up, the usual procedure is to add to the polymer solution substances which destroy the catalysts (stopping agents) and stabilizers to protect the polymers against degradation or cross-linking, then to remove residual monomer and possibly a portion of the solvent by heating and then to introduce this pretreated polymer solution with stirring into hot water containing small quantities of an emulsifying agent. In this process, a mixture of solvent and water distills off and the polymer remaining behind is precipitated in a crumbly form. However, in the case of 1,4-cis-polybutadiene solutions prepared in aromatic solvents with organometallic catalysts containing titanium, intensively brown coloured products are obtained by this method on drying the crumbly precipitate. Although some of the 1,4-cis-polybutadiene is used in mixtures of carbon black for car tires, it is of great technical importance to obtain colourless butadiene which can be used for producing white or pale coloured rubber articles.

Further, it is known from British patent specification No. 889,154 that butadiene polymers prepared with organometallic coordination catalysts in aromatic solvents can be worked up by transferring the polymer solution into solvent-containing emulsions with the aid of aqueous emulsifier solutions and then removing the solvent from these emulsions by steam distillation. Polymer emulsions free from solvent are thereby obtained, from which the polymer can be isolated by known methods, for example by the addition of common salt solution etc.

It is, therefore, an object of this invention to provide a novel process for the preparation and recovery of rubbery polymers of conjugated dienes in a crumbly form and having a low ash content. Another object of this invention is a process in which 1,3-butadiene is polymerized with specific complex catalysts in the presence of a hydrocarbon diluent, said hydrocarbon solution of the polymer being emulsified with water in the presence of emulsifiers which have been obtained by the reaction of aliphatic or aromatic carboxylic acids, resinic acids or copolymers of styrene-maleic acid anhydride or styrene-maleic acid semiesters with polyglycol ether amines. These emulsions of the "water-in-oil type" which have been prepared from the polymer solutions obtained by polymerization of 1,3-butadiene giving rise to immediate "precipitation" of the polymer in a crumbly form on the subsequent removal of solvent by steam distillation. This saves one stage of the process and at the same time porduces a product of low ash content since precipitation with sodium chloride or the like is avoided.

The catalysts used in the polymerization step of the process comprises titanium-containing coordination catalysts. Particularly effective catalyst systems comprise reaction components from aluminium alkyls or lithium-aluminium alkyls, halogens and titanium halides. Examples of such catalyst systems are for instance:

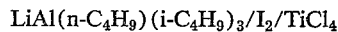
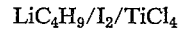
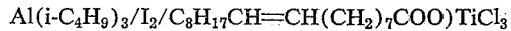
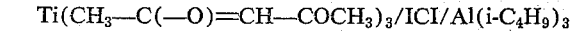
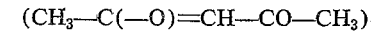
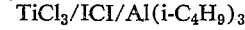

For reasons of technical procedure, the following conditions must be observed for the emulsifier components:

The carboxylic acids must be so difficultly volatile that they do not pass over with the solvent-water mixture because the solvent is to be used again for the polymerisation without interposing a purification step, which would be uneconomical. The carboxylic acids contain more than 10 carbon atoms and are used in quantities of 0.1 to 5% by weight, preferably 0.2 to 2% by weight, calculated on the quantity of polymer.

The amines to be used for working up process according to the invention must be difficultly volatile and water-soluble so that when the solvent is driven off by means of steam, the solvent obtained is free from amine and can be returned to the polymerisation process after a simple drying operation. The amines are used in quantities of 0.1 to 3% by weight, preferably in qauntities of 0.2 to 1% by weight calculated on the quantity of polymer.

The above mentioned emulsifiers can be obtained by reaction of such carboxylic acids as stearic acid, alkylated benzoic acid, phthalic acid semiesters of higher alcohols, diphenylcarboxylic acids, naphthalinic carboxylic acid, abietic acid or disproportionated abietic acid and further, copolymers of styrene and maleic acid anhydride or maleic acid semiesters of aliphatic alchols such as ethanol, butanol, 2 - alkylhexanol, with polyglycol ether amines, examples of which are:

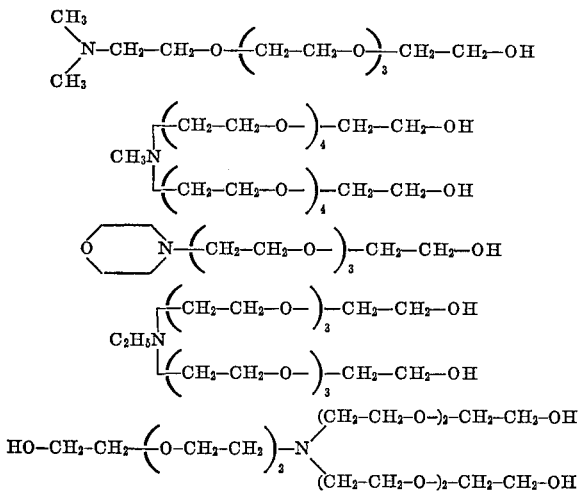

Particularly suitable are polyglycolpolyetheramines from 1 mol of dimethylamine and 2 to 10 mols of ethylene oxide and from 1 mol of morpholine and 2 to 10 mols of ethylene oxide.

To carry out the process of the invention, the polymer solution containing complex titanium catalysts is converted into a reversed emulsion after the addition of a non-colourising mono- or polynuclear phenol stabiliser in quantities of 0.5 to 2% (X-tert.-butyl group and P-ether of phosphoric acid), for example:

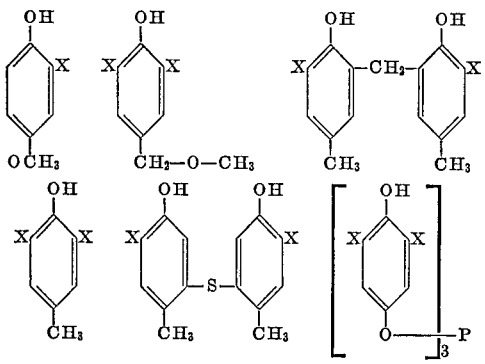

and possibly after the removal of residual monomers and a portion of the solvent by evaporation, by mixing with 10 to 100 parts by weight, preferably 20 to 30 parts by weight of water, which contains 0.1 to 5% by weight of one of the above-mentioned carboxylic acids and 0.1 to 3% by weight, calculated on 100 parts by weight of solid polymer, of one of the above mentioned amines in solution. Alternatively, the emulsion may be produced by first dissolving carboxylic acid and polyglycol ether amine in the polymer solution and then adding water while mixing thoroughly by the usual means. This emulsion is introduced continuously, with stirring, into water which is at a temperature above the boiling point of the azeotropic water-solvent mixture. A solvent-water mixture is distilled off in the process. The butadiene polymer is precipitated in pure, white crumbs which can be pressed into a colourless clear block after drying.

A further advantage of the process is that it is also suitable for working up polymers whose solutions manifest a marked Weissenberg effect (see Fr. Eirich, Rheology Academic Press, New York, 1956). The strongly elastoviscous behaviour of solutions of these polymers prevents the formation of polymer crumbs when these solutions are introduced into hot water. The consequences are incomplete inactivation and separation of the catalyst components. Complete separation of solvent is also prevented under the conditions given hereinbefore.

Surprisingly, the elastoviscous behaviour disappears completely when the solution is emulsified. The reversal emulsions which are obtained by the process according to the invention can readily be converted into a uniform dispersion of crumbs of the polymers in water by introduction into hot water. This provides a considerable technical advance for the production of polymers of conjugated diolefines because precisely these polybutadiene types, which are particularly valuable owing to the ease with which they can be processed and owing to their excellent technological properties, manifest a more or less strongly developed elastoviscous behaviour in their solutions in aliphatic or aromatic hydrocarbons.

EXAMPLE 1

440 parts by weight of lithium - aluminium-n-butyl-triisobutyl, 0.228 part by weight of iodine and 0.114 part by weight of titanium-IV-chloride are added to a mixture of 900 parts by weight of toluene and 100 parts by weight of butadiene at 15° C. with exclusion of oxygen and moisture. The reaction temperature is controlled so that a temperature of 30° C. is reached after 2 hours. Polymerisation is completed after a total of 4 hours. The polymer solution is treated with 1 part by weight of 2:6 - di - tertiary - butyl - 4 - methylphenol dissolved in 40 parts by weight of toluene. A solution of 0.2 part by weight of styrene-maleic acid copolymer and 0.2 part by weight of a polyglycol ether amine from dimethylamine with 7 mols, ethylene oxide dissolved in 150 parts of water are then stirred into the reaction mixture. An emulsion is formed immediately. This emulsion is slowly introduced into 7000 parts by weight of water at 98° C. with vigorous stirring. In this process, a toluene-water mixture distills off and a uniform dispersion of polybutadiene crumbs in water is formed. The white crumbs measuring 3 to 4 mm. are filtered off, washed and dried. 96 parts by weight of a colourless, clear polymer are obtained.

EXAMPLES 2–5

The tests summarised in the table were carried out as described in Example 1 except that different emulsifier combinations were used and these were added to the polymer solution before the addition of water.

EMULSIFIER COMBINATION

| Example No. | Carboxylic acid | Parts/100 parts of polymer | Amine | Parts/100 parts of polymer | Colour of dry butadiene polymer |
|---|---|---|---|---|---|
| 2 | Stearic acid | 0.2 | Dimethylamine plus 7 ethylene oxide | 0.2 | Colourless, clear. |
| 3 | Copolymer of styrene and maleic acid isooctyl semiester (1:1). | 0.25 | Methylamine plus 10 ethylene oxide | 0.2 | Do. |
| 4 | Disproportionated abietic acid | 0.3 | Morpholine plus 5 ethylene oxide | 0.2 | Do. |
| 5 | Diphenyl-4-carboxylic acid | 0.2 | Ethylemina plus 8 ethylene oxide | 0.2 | Do. |

EXAMPLE 6

In 1000 parts by weight of dry toluene (water-content 6–10 p.p.m.) a catalyst-solution is prepared by stirring and adding 0.305 part by weight of trichlortitaniumoleate, 0.354 part by weight of iodine and 1.11 parts by weight of tri-iso-butyl-aluminum under oxygen-free and moisture-free conditions. 100 parts by weight of 1,3-butadiene (water-content about 20 p.p.m.) are introduced in the black-brown catalyst-solution. Polymerization starts immediately. Maintaining a polymerization-temperature of 35–40° C., the polymerization is finished after 3–4 hours. The obtained polymer-solution shows a strongly elasto-viscous behavior, tends to formation of threads and it is difficult to cast this solution. To the polymer-solution 1 part by weight of 2,6-di-tert.-butyl-4-methylene-phenol as well as a solution of 0.8 part by weight of a disproportionated abietinic acid and 0.8 part by weight of a polyglykoletheramine consisting of 1 mol of morpholine and 4 mols of ethyleneoxide are added together with 500 parts by weight of water under intensive stirring. A pourable emulsion which is slowly introduced into 7000 parts by weight of hot water (95–98° C.) with vigorous stirring is obtained. Distilling off a toluene-water-mixture the polymerizate with particle size of 3–8 mm. great crumbs is obtained. The crumbs are filtered off, squeezed off, dried in vacuum at a temperature of 60° C. and then pressed to a block. 99 parts by weight of a nearly colourless polybutadiene having a high film-strength are obtained. The ash content of the polymer is below 0.2 percent.

EXAMPLE 7

To a elastoviscous polybutadiene-solution, produced according to Example 6, 1 part by weight of 2,6-di-tert.-butyl-4-methylphenol, 1 part by weight of disproportionated abietinic acid and 1 part by weight of a polyglycoletheramine, consisting of 1 mol diethylamine and 5 mols ethyleneoxide, are added. By addition of 900 parts by weight of water by intensive stirring an emulsion capable of being cast is obtained, from which polybutadiene crumbs are produced according to Example 6. After drying of the crumbs in vacuum at a temperature of 60° C. 98 parts by weight of a nearly colourless, clear polymer is obtained. By omitting of the glycoletheramine the water can be dispersed only incompletely and the obtained emulsion is stringy. Introducing said emulsion in hot water, the polybutadiene is formed to lumps, which partially wind around the stirrer. A yellow-brown polybutadiene, having an ash content of 0.3–0.35 percent, is obtained.

We claim:
1. In the process of recovering polybutadiene polymer from a mixture prepared by polymerizing 1,3-butadiene in the presence of a titanium-containing coordination catalyst in a hydrocarbon diluent containing a non-coloring mono-or polynuclear phenolic stabilizer for said polymer by steam distilling off hydrocarbon diluent-water vapor mixture, the improved method of recovering said polybutadiene polymer which comprises the steps of forming a water-in-oil emulsion of said mixture by the addition of water in the presence of an emulsifier selected from the group consisting of the reaction product of a polyglycol ether amine and an organic acid compound selected from the group consisting of aliphatic carboxylic acids having at least 10 carbon atoms, aromatic carboxylic acids having at least 10 carbon atoms, rosin acids, copolymers of styrene and maleic anhydride and copolymers of styrene and maleic acid semiester; subjecting said water-in-oil emulsion to steam distillation under conditions which distill over hydrocarbon diluent-water vapor mixture and recovering polybutadiene polymer.

2. The process of claim 1 wherein said steam distillation is carried out by continuously introducing said water-in-oil emulsion into water having a temperature above the vapor temperature of the hydrocarbon diluent-water vapor mixture.

3. The process of claim 1 wherein said emulsifier is present in the amount of about 0.1 to about 10% by weight based on the weight of said butadiene polymer and the amount of water added to form said water-in-oil emulsion is from about 10 to 100% by weight, based on the weight of polybutadiene polymer.

4. The process of claim 1 wherein said selected organic acid is stearic acid.

5. The process of claim 1 wherein said selected organic acid is a copolymer of styrene and maleic acid semiester in the molar ratio of 1:1.

6. The process of claim 1 wherein said selected organic acid is diphenyl-4-carboxylic acid.

7. The process of claim 1 wherein said selected organic acid is disproportionated abietic acid.

8. The process of claim 1 wherein said polyglycol ether is the reaction product of 1 mol of dimethylamine and from 2 to 10 mols of ethylene oxide.

9. The process of claim 1 wherein said polyglycol ether amine is the reaction product of 1 mol of morpholine and from 2 to 10 mols of ethylene oxide.

References Cited

UNITED STATES PATENTS 3,190,686    6/1965    Mitacek et al.

OTHER REFERENCES

Calculation of HLB Values of Non-Ionic Sulfactants, by William C. Griffin, Journal of the Society of Cosmetic Chemists, vol. V, No. 4, December 1954.

JOSEPH L. SCHOFER, Primary Examiner

W. HAMROCK, Assistant Examiner

U.S. Cl. X.R.

260—29.7, 78.5, 94.3, 96